United States Patent
Montean, Jr.

[15] 3,700,277
[45] Oct. 24, 1972

[54] ROOF BOW DEVICE

[72] Inventor: John Montean, Jr., North Olmsted, Ohio

[73] Assignee: The Ohio Moulding Corporation, Wickliffe, Ohio

[22] Filed: May 3, 1971

[21] Appl. No.: 139,774

[52] U.S. Cl. .................................296/104, 52/47
[51] Int. Cl. .............................................B62d 25/06
[58] Field of Search ....296/118; 52/45, 53, 730, 732, 52/738

[56] References Cited

UNITED STATES PATENTS 1,093,657  4/1914  Sisson ........................296/118
1,593,821  7/1926  Gilpin ............................52/53

Primary Examiner—Benjamin Hersh
Assistant Examiner—David M. Mitchell
Attorney—Teare, Teare & Sammon

[57] ABSTRACT

A roof bow device for use with a vehicle including a channel-like body member made from a single piece of sheet material adapted at its opposed ends for attachment to a vehicle. The body member includes a pair of oppositely disposed side walls interconnected together by a web portion with flanges extending laterally outwardly from the side walls adjacent the end remote from the web portion. The flanges each include flute-like deformations adjacent the opposed ends of the body member to provide optimum securement with the vehicle.

10 Claims, 6 Drawing Figures

Patented Oct. 24, 1972

3,700,277

INVENTOR.
John Montean, Jr.
BY
Teare, Teare & Sammon
Attorneys

ROOF BOW DEVICE

BACKGROUND OF THE INVENTION

The present invention relates generally to a superstructure for use with vehicles, and more particularly relates to an improved construction for a roof bow device for supporting rigid and/or flexible covers of the type to be employed over the top of a vehicle compartment, such as a tractor-trailer or the like.

Conventionally, trucks having cartage compartments or trailers have been provided with various types of superstructure arrangements for supporting various types of roof materials, such as sheet metal or the like, tightly secured thereover to cover and protect the contents transported by the vehicle. Heretofore, the superstructure generally included a plurality of roof bow members which were generally of a fabricated construction. Such prior devices have generally been of a multi-part arrangement including three or more components fabricated together to provide the desired structure. For example, the bow member has been fabricated from a cross-piece having separate flanges connected thereto by various types of fastening arrangements, such as by weldments, bolts, rivets, screws and the like. Such prior arrangements have not been entirely satisfactory for a number of reasons. In such superstructure arrangements, it is important that the individual roof bow members incorporate maximum strength characteristics so as to operably cooperate to add and maintain a sufficient amount of rigidity between the opposed side walls of the trailer, for example, while at the same time being capable of supporting the load imparted by the roof material and/or external elements. Accordingly, the roof bows are subjected to considerable stress/strain forces, particularly when the vehicle is operated at high speeds, on rough roads and/or during adverse weather conditions. In addition, such prior arrangements by reason of their fabricated construction generally are expensive and time consuming to produce, and oftentimes being costly to maintain and/or repair.

SUMMARY OF THE INVENTION

A roof bow device of one piece construction for use with a vehicle comprising, a channel-like body member formed from a single piece of sheet material adapted at its opposed ends for attachment to said vehicle, said body member being defined by opposed side walls integrally joined at one end by a centrally disposed web portion, flange means extending outwardly from the end edges of said walls remote from said web portions, and said flange means including flute-like deformations adjacent the opposed ends of said body member to provide a rigid structure for attachment to said vehicle. In the invention, the flange means include an oppositely disposed pair of flange members projecting laterally outwardly from the side walls with each flange member being reversely bend adjacent the opposed ends of said body member in a generally helical convoluted path defining said flute-like structure.

DESCRIPTION OF THE PREFERRED EMBODIMENTS

Figure 3:
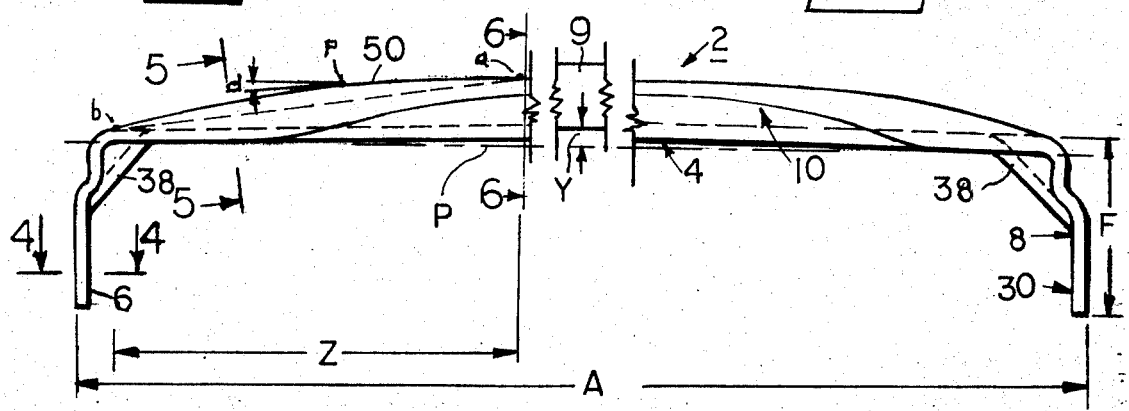
FIG. 3 is a side elevation view, partially broken, illustrating the roof bow device of the invention having at each end the attachment construction shown in FIG. 1.

Referring again to the drawings, and particularly to FIG. 3 thereof, there is illustrated the roof bow device, designated generally at 2, of the invention which is of an elongated generally inverted U-shaped construction for attachment between the side walls of a compartment, such as on a truck trailer or the like, not shown. In the invention, the device 2 is of a unitary, one-piece construction made from a length and/or piece of sheet material, such as sheet steel or the like. In the embodiment shown, the device 2 includes an intermediate body member 4 of arched construction having integrally formed at opposed ends thereof attachment means 6 and 8 for mounting the device with a vehicle.

Figure 6:
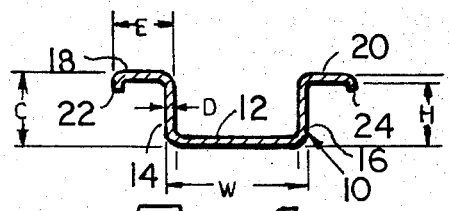
FIG. 6 is a vertical section view taken along the line 6—6 of FIG. 3.

As best seen in FIGS. 3 and 6, the intermediate body member 4 includes an elongated generally U-shaped channel member 10 which extends throughout a major portion of its length thereof. The channel member 10 is shown as including a generally planar web portion 12 and a pair of oppositely disposed side walls 14 and 16 (FIG. 6) made integral with and extending perpendicularly upwardly from the web portion 12. The channel member 10 may be gently arched lengthwise thereof having its center, as at 9, offset upwardly a distance Y from a plane extending through the opposite ends of the web portion 12. The side walls 14 and 16 are, in turn, bent laterally outwardly adjacent their respective ends to provide a pair of oppositely disposed flanges 18 and 20, respectively, which extend outwardly and in generally parallel relation with respect to the web portion 12 over the major length of the channel member 10. The flanges 18 and 20 may, in turn, be bent or turned down adjacent their terminal edges to provide skirt-like portions 22 and 24 extending along the length of the flanges 18 and 20.

In the invention, the flanges 18 and 20 are progressively and uniformly deformed at the opposed ends of the channel member 10 to provide a convoluted flute-like construction which smoothly merge with the web portion 12 to provide the respective attachment means 6 and 8. Since such flute-like construction is generally identical for each flange, the following description will proceed with reference to one wherein like reference characters refer to like parts throughout.

Figure 1:
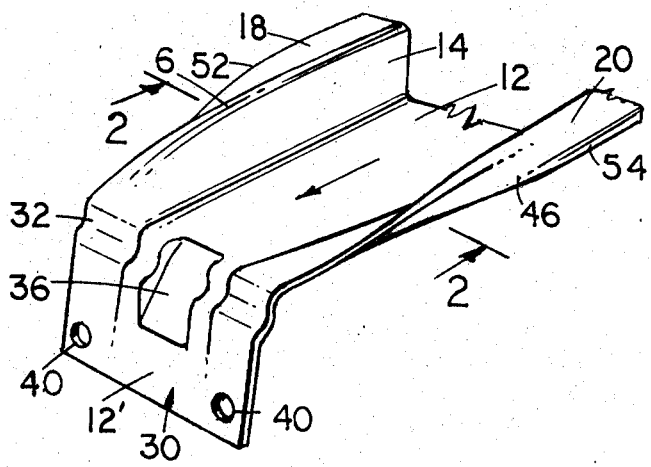
FIG. 1 is a fragmentary, generally perspective view showing one end of the roof bow device made in accordance with the present invention.
Figure 2:
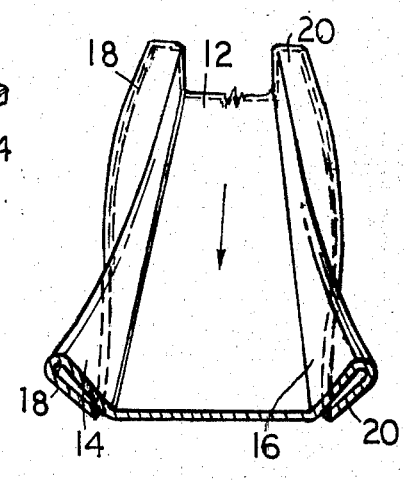
FIG. 2 is a vertical section view taken along the line 2—2 of FIG. 1.
Figure 5:
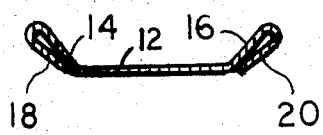
FIG. 5 is a generally vertical section view taken along the line 5—5 of FIG. 3.

As best seen in FIGS. 1–3, the flanges 18 and 20 are each twisted downwardly and inwardly in counterclockwise and clockwise directions, respectively, (looking in the direction of the arrows) commencing at the points (a) through the mid-points (p) in the manner of a helical reverse twist so as to terminate at the points (b). At the points (a) the flanges 18 and 20 are spaced from the web portion 12 by the distance defined by the height of the side walls 14 and 16 being generally parallel to the web portion 12 while at the points (b) the flanges 18 and 20 are generally co-planar with the web portion so that the flanges, in effect, have been reversely twisted between points (a) and (b) by approximately 180°. As best seen in FIG. 5, the flanges 18 and 20 are reversely twisted into engaged relation with the confronting underside of the side walls 14 and 16 commencing at a point approximately adjacent the mid-points (p) and extending in a direction toward the terminal points (b). In other words, the flanges 18 and 20 are convoluted or twisted 90° in opposite directions with respect to one another and away from the mid-points (p) to provide the flute-like constructions which merge smoothly at the opposed ends onto themselves and onto the web portion 12. By this arrangement, abrupt deformation of the material is avoided providing an optimum structure to provide the attachment means 6 and 8.

Figure 4:
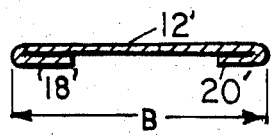
FIG. 4 is a horizontal section view taken along the line 4—4 of FIG. 3.

The attachment means 6 and 8 are each preferably of identical construction so that the following description will proceed with respect to one thereof wherein like reference characters refer to like parts throughout. As best seen in FIGS. 1, 3 and 4 the attachment means 6 includes an integral leg member 30 bent downwardly generally at right angles to the channel member 10. The member 30 is defined by a continuation of the web portion 12' being bent downwardly and generally at right angles to the web portion 12 together with continuation of the flanges 18' and 20' being bent downwardly generally at right angles to the web portion 12 so as to be in parallel engaged relation with the web portion 12', as best seen in FIG. 4. The leg member 30 may be provided with a pair of oppositely disposed stepped shoulders 32 and 34 which have a generally L-shaped configuration, as best seen in FIG. 3. At the juncture of the web portion 12 with the leg member 30, there is provided a recessed boss-like depression 36 disposed generally centrally between the opposed reverse bent flanges 18' and 20'. This construction provides a bridging rib member 38 (FIG. 3) extending angularly between the undersurface of the web portion 12 and the inner surface of the leg member 30 so as to strengthen the structure at the junction thereof. The pair of legs 30 are each provided with apertures 40 adapted to receive suitable fasteners (not shown) for attachment of the roof bow device to the vehicle in a manner as known in the art.

In the invention, the device 2 may be dimensioned so as to accommodate the desired vehicle size. For example, where the device has an overall length of between about 90–96 inches, the dimensions may generally be, as follows:

A — length 90–96 inches (FIG. 3)
B — width 3.45 inches (FIG. 4)
C — height 1.00 inches (FIG. 6)
D — thickness 0.060 inches (FIG. 6)
E — width 0.750 inches (FIG. 6)
F — height 2.150 inches (FIG. 3)
H — height 0.93 inches (FIG. 6)
W — width 2.00 inches (FIG. 6)
Y — distance 0.75 inches (FIG. 3)

In accordance with the foregoing dimensional relations, the distance Z taken linearly and parallel to the web portion 12 between the points of merger (a) and (b) of the curve 50 (FIG. 3) with the planar portions of the flanges 18 and 20 and the web portion is approximately 7.50 inches or approximately 15 inches for the curvature at both ends of the channel member 10. Accordingly, the ratio of such length to that of the overall length of the device is approximately 1:6 in the embodiment illustrated.

As best seen in FIG. 3, the mid-point (p) of the curve is defined by a line perpendicular at the mid-point to the imaginary line which connects points (a) and (b). Preferably, the curve 50 is generally symmetrical on opposite sides of the mid-point (p).

In the invention, the outer edges 52 and 54 (FIG. 1) of the flanges 18 and 20 define, when in the deformed condition, a generally cylindrical helix. In the embodiment shown, the edges 52 and 54 are deformed so as to define approximately one-half the helix. For example, the lead length L of the helix would be approximately 15.25 inches wherein the diameter of the cylinder or the height of the respective side walls 14 and 16 is approximately 0.935 inches. Moreover, in the case of the edges 52 and 54 defining approximately one-half the helix, the distance between the points (a) and (b) is approximately ½L or approximately 7.625 inches. The formula for determining the lead length of the helix is as follows: $L = 2H/\sin(d)$ In the above formula, $H$ equals the height of the sidewalls 14 and 16 (i.e. 0.93 inches) and (d) is the angle between the axis of the helix and either the general plane of the upper surfaces of the respective flanges 18 and 20 or that of the web portion 12. In such case, the axis of the helix is tangent to the curve 50 at the mid-point (p) thereof. In the embodiment shown, the angle (d) is approximately 7°, and such angle is preferably between 5° and 10°. In any event, and referring to FIG. 3, the dimension Z inwardly from the point (b), such as approximately 7½ inches, is the shortest dimension over which the convolution could be made irrespective of the overall length of the device.

I claim:

1. A roof bow device with a vehicle comprising,
a channel-like body member formed from sheet material adapted at its opposed ends for attachment to said vehicle,
said body being defined by opposed side walls integrally joined at one end by a centrally disposed web portion,
flange means extending outwardly from the end edges of said walls remote from said web portion,
said flange means including a pair of spaced, laterally extending flange members,
said walls being deformed outwardly into generally coplanar relation with respect to said web portion adjacent the opposed ends of said body member, and
said flange members being reversely bent into confronting relation with respect to said walls to form fluted deformations adjacent the opposed ends of said body member for strengthening said device for attachment to said vehicle.

2. A roof bow device in accordance with claim 1, wherein
said channel member is arched in its lengthwise direction, said web portion and side walls together defining a generally U-shaped configuration, in transverse section, and said flange members being bent downwardly adjacent their terminal edges to provide skirt portions extending along the major length of said flange members.

3. A roof bow device in accordance with claim 1, wherein said flute-like deformations each comprise an outwardly opening, spirally concave depression formed by reverse twisting the material of said body member forming said flange means.

4. A roof bow device in accordance with claim 1, wherein the flange members of said fluted deformations are spaced from said web portion generally by the distance defined by the height of said side walls adjacent one end and are generally co-planar with said web portion adjacent the opposite end thereof, and said flange members being disposed in engaged relation with the confronting under side of the respective side walls adjacent said opposite end.

5. A roof bow device in accordance with claim 1, wherein each of the respective flange members adjacent each of the opposed ends of said body member are bent downwardly and inwardly in clockwise and counter clockwise directions, respectively, toward the respective of said opposed ends in a helical reverse bend of approximately 180° to provide said fluted deformations.

6. A roof bow device in accordance with claim 5, wherein the flange members of said fluted deformations include outer edges which define a generally cylindrical helix curve with the lead length (L) of the helix represented by the formula $$L = \frac{2H}{\sin (d)}$$

with H being substantially equal to the height of said side walls and (d) is substantially the angle between the axis of the helix and the general plane of said web portion, and the linear distance taken parallel to said web portion between the ends of each of the respective fluted deformations being approximately ½ L.

7. A roof bow device in accordance with claim 6, wherein said helix curve has a mid-point defined by an imaginary line perpendicular to an imaginary linear line extending between the ends of each of said fluted deformations, said curve being substantially symmetrical on opposite sides of said mid-point, and the axis of said helix being tangent to said curve at said mid-point.

8. A roof bow device in accordance with claim 1, including attachment means formed adjacent the opposed ends of said body member for attaching said device to said vehicle.

9. A roof bow device in accordance with claim 8, including rib means formed in said body member and extending between said web portion and said attachment means.

10. A roof bow device in accordance with claim 9, wherein said attachment means includes a pair of leg-like extensions formed adjacent the opposed ends of said body member, said extensions projecting in generally perpendicular relation with respect to said web portion, and said rib means comprising a boss-like depression formed in the material of said body member which has a inner wall extending between said web portion and one of said extensions.

* * * * *